(12) United States Patent
Faith et al.

(10) Patent No.: US 9,419,403 B2
(45) Date of Patent: Aug. 16, 2016

(54) TRANSCEIVER SYSTEM

(71) Applicant: Samtec, Inc., New Albany, IN (US)

(72) Inventors: Chadrick Paul Faith, Corydon, IN (US); Keith Richard Guetig, Louisville, KY (US); Dale Francis Schmelz, Depauw, IN (US); Randall Eugene Musser, Enola, PA (US); John Allen Mongold, Middletown, PA (US)

(73) Assignee: SAMTEC, INC., New Albany, IN (US)

(*) Notice: Subject to any disclaimer, the term of this patent is extended or adjusted under 35 U.S.C. 154(b) by 326 days.

(21) Appl. No.: 13/950,628

(22) Filed: Jul. 25, 2013

(65) Prior Publication Data

US 2013/0303025 A1  Nov. 14, 2013

Related U.S. Application Data

(63) Continuation-in-part of application No. 13/895,571, filed on May 16, 2013, now Pat. No. 8,787,711, which is a continuation of application No. 13/758,464, filed on Feb. 4, 2013, now Pat. No. 8,588,562, which is a (Continued)

(51) Int. Cl.
| | |
|---|---|
| *G02B 6/42* | (2006.01) |
| *H01R 43/26* | (2006.01) |
| *H01R 12/59* | (2011.01) |
| *H01R 12/71* | (2011.01) |

(Continued)

(52) U.S. Cl.
CPC ............. *H01R 43/26* (2013.01); *G02B 6/428* (2013.01); *G02B 6/4284* (2013.01); *H01R 12/598* (2013.01); *H01R 12/716* (2013.01);

*H01R 12/62* (2013.01); *H01R 12/70* (2013.01); *H01R 13/6275* (2013.01); *Y10T 29/49149* (2015.01)

(58) Field of Classification Search
CPC ........ G02B 6/428; G02B 6/4284; H01R 12/62; H01R 12/716
See application file for complete search history.

(56) References Cited

U.S. PATENT DOCUMENTS

| | | | | |
|---|---|---|---|---|
| 5,980,324 A | * | 11/1999 | Berg | H01R 13/24 439/630 |
| 6,739,760 B2 | * | 5/2004 | Cheng | G02B 6/4292 385/89 |

(Continued)

FOREIGN PATENT DOCUMENTS

| | | |
|---|---|---|
| CN | 101499821 A | 8/2009 |
| EP | 1 096 840 A2 | 5/2001 |

(Continued)

OTHER PUBLICATIONS

Official Communication issued in corresponding European Patent Application No. 12791414.1, mailed on Jan. 15, 2015.

(Continued)

*Primary Examiner* — Daniel Petkovsek
(74) *Attorney, Agent, or Firm* — Keating & Bennett, LLP

(57) ABSTRACT

A transceiver for a two-connector system includes a circuit board, at least one cable attached to the circuit board, and a housing arranged to contain the circuit board. The two-connector system includes a front connector and a back connector. When the transceiver is connected to the two-connector system, a front edge of the circuit board is arranged to engage with the front connector and an intermediate portion of the circuit board is arranged to engage with the back connector.

17 Claims, 16 Drawing Sheets

Related U.S. Application Data continuation of application No. 13/539,173, filed on Jun. 29, 2012, now Pat. No. 8,588,561.

(60) Provisional application No. 61/787,274, filed on Mar. 15, 2013, provisional application No. 61/636,005, filed on Apr. 20, 2012, provisional application No. 61/504,072, filed on Jul. 1, 2011.

(51) Int. Cl.
  *H01R 12/70* (2011.01)
  *H01R 12/62* (2011.01)
  *H01R 13/627* (2006.01)

(56) References Cited

U.S. PATENT DOCUMENTS

| | | | |
|---|---|---|---|
| 7,329,054 B1 | 2/2008 | Epitaux et al. | |
| 7,402,070 B1 | 7/2008 | Wu | |
| 7,438,484 B2 * | 10/2008 | Tamanuki | G02B 6/4201 174/50 |
| 7,513,698 B2 | 4/2009 | Andersson | |
| 7,581,891 B2 | 9/2009 | Wang | |
| 7,648,287 B2 | 1/2010 | Epitaux et al. | |
| 7,766,559 B2 | 8/2010 | Epitaux et al. | |
| 7,824,112 B2 | 11/2010 | Epitaux et al. | |
| 8,053,667 B2 | 11/2011 | Chen et al. | |
| 8,200,097 B2 | 6/2012 | Cole | |
| 8,979,558 B2 * | 3/2015 | Rubens | H01R 13/6596 439/131 |
| 2005/0191879 A1 | 9/2005 | Ice | |
| 2005/0232555 A1 | 10/2005 | Rosenberg | |
| 2006/0140554 A1 | 6/2006 | Oki | |
| 2006/0270283 A1 | 11/2006 | Kumazawa et al. | |
| 2008/0070439 A1 | 3/2008 | Kusuda et al. | |
| 2008/0222351 A1 | 9/2008 | Verdiell et al. | |
| 2009/0175579 A1 | 7/2009 | Tanaka et al. | |
| 2011/0123150 A1 | 5/2011 | Zbinden et al. | |
| 2011/0123151 A1 | 5/2011 | Zbinden et al. | |
| 2013/0236144 A1 * | 9/2013 | Tong | G02B 6/4293 385/89 |

FOREIGN PATENT DOCUMENTS

| | | |
|---|---|---|
| GB | 2 405 264 A | 2/2005 |
| JP | 2006-331741 A | 12/2006 |
| JP | 2008-090232 A | 4/2008 |
| TW | M370857 U1 | 12/2009 |
| WO | 2007/119814 A1 | 10/2007 |

OTHER PUBLICATIONS

Official Communication issued in corresponding Korean Patent Application No. 9-5-2013-045116377, mailed on Jun. 28, 2013.

Official Communication issued in corresponding Japanese Patent Application No. 2013-523390, mailed on Aug. 6, 2013.

Zbinden et al., "Transceiver and Interface for IC Package", U.S. Appl. No. 13/539,173, filed Jun. 29, 2012.

Zbinden et al., "Transceiver and Interface for IC Package", U.S. Appl. No. 13/758,464, filed Feb. 4, 2013.

Zbinden et al., "Transceiver and Interface for IC Package", U.S. Appl. No. 13/895,571, filed May 16, 2013.

* cited by examiner

TRANSCEIVER SYSTEM

BACKGROUND OF THE INVENTION

1. Field of the Invention

The present invention relates to transceivers and IC packages. More specifically, the present invention relates to transceivers that can be directly plugged into an IC package.

2. Description of the Related Art

Known miniature transceivers include copper transceivers and optical transceivers. Optical transceivers are typically used for applications that require long signal transmissions or high data rates. However, known optical transceivers are expensive, and thus are not preferable for applications that do not require an optical connection, for example, applications with a short signal transmission length or applications that use low speed signals. Examples of known optical transceivers are disclosed in U.S. patent application Ser. Nos. 13/539,173; 61/504,072; and 61/636,005, the entire contents of which are hereby incorporated by reference. Much of the cost of these optical transceivers is due to the optical engines within the optical transceivers that convert light to electricity and electricity to light. Examples of the optical engines are disclosed in U.S. Pat. Nos. 7,329,054; 7,648,287; 7,766,559; and 7,824,112; U.S. Patent Application Publication Nos. 2008/0222351, 2011/0123150, and 2011/0123151; and U.S. Patent Application No. 61/562,371, the entire contents of which are hereby incorporated by reference.

In contrast, known copper transceivers are less expensive than known optical transceivers, but provide lower data rates and are typically unusable for longer signal transmissions. However, because known connectors are not designed to accept both optical transceivers and copper transceivers, a system that uses a known copper transceiver must be redesigned for use with an optical transceiver if it is desired to increase the data rate or signal transmission distance.

Furthermore, known copper transceivers have a number of known problems. Typically known copper transceivers include flying leads, which are typically only used for testing/debugging. In particular, known copper transceivers have impedance discontinuities in the cable termination region, that is, in the area where cable(s) are connected to a circuit board or other electrical components within the transceiver. The connection density in the cable termination region is also limited by the pitch of the cable(s) that are used with the transceiver. Further, thermoplastic housings often require screws and other hardware that add expense, and latching systems are often not very robust, which can lead to accidental disconnection of the transceiver.

Moreover, known transceivers use circuit boards that typically have a routing tolerance of +/−0.005", which is not a tight enough tolerance to mate to a 0.5-mm pitch connector. Accordingly, the pitch of a typical connector used with known transceivers is typically at least 0.635 mm (0.025").

One example of a known miniature transceiver is a Quad Small Form-factor Pluggable (QSFP or QSFP+) transceiver. QSFP transceivers are compact, hot-pluggable transceivers that include connectors that are designed to accept both copper and optical transceivers. However, a typical QSFP transceiver uses a relatively large receptacle cage and a mating connector with a 0.8 mm pitch, which results in the QSFP transceiver requiring a significant amount of space on the circuit board to which the QSFP transceiver is connected.

Transceiver size may be reduced and/or performance increased by using precision soldering or intricate hand soldering. However, these methods increase expense and may cause defects.

RF connectors or other expensive components may be included with a known miniature transceiver to improve performance. However, such connectors or components take up space on a circuit board or device to which the transceiver is to be connected and increase overall expense of the system that includes the transceiver. Similarly, custom or exotic fixtures may be used with a known miniature transceiver to improve performance. Such fixtures include, for example, components used in high-end vision systems or components manufactured using active alignment and registration automation (e.g., using laser alignment). However, such fixtures typically require expensive tooling, have complex design concerns, and have long set-up times for manufacturing, which increase overall expense of the system that includes the transceiver. Furthermore, custom or exotic fixtures are difficult and expensive to repair.

Snap features and press fit bosses have been used to secure known miniature transceivers in place. For example, a known miniature transceiver may include one or more pins that mechanically deform when inserted into corresponding holes of a known connector to secure the transceiver to the connector. However, these components are relatively unreliable and may lead to undesirable signal interruptions or mechanical failures. Friction latches have been used to secure known miniature transceivers in place. For example, a known connector may include one or more brackets that press against the sides of a known miniature transceiver to secure the transceiver to the connector. However, friction latches typically have a low withdrawal force, which allows transceivers to accidentally un-mate and cause transmission link failures or other system failures.

Termination-region density improvements have been made by using a cable with smaller gauge wires, which reduces pitch and increases density. However, using smaller gauge wires reduces performance of the transceiver, particularly by limiting data rate and signal transmission distance.

Furthermore, if conventional manufacturing methods are used to produce circuit boards with 0.5-mm pad pitches, high yield losses result due to the requirements for tolerances of the circuit boards. Accordingly, conventional manufacturing methods increase expense due to a high proportion of circuit boards rejected during sorting. In particular, conventional manufacturing methods often provide a yield of acceptable circuit boards that is several orders of magnitude lower than the rejected circuit boards.

SUMMARY OF THE INVENTION

To overcome the problems described above, the preferred embodiments of the present invention provide a two-connector assembly including front and back connectors. The front connector preferably is a connector that is configured to receive a front edge of a circuit board from a transceiver, and the back connector preferably is a connector that is configured to receive an intermediate portion of the circuit board when the front edge of the circuit board is inserted into the front connector. Various preferred embodiments of the present invention provide a high-density connection for cables that has a low-cost, is easy to deploy, has few parts, and has sufficient mechanical retention.

A transceiver according to a preferred embodiment of the present invention includes a circuit board, at least one cable attached to the circuit board, and a housing arranged to contain the circuit board. The two-connector system includes a front connector and a back connector. When the transceiver is connected to the two-connector system, a front edge of the circuit board is arranged to engage with the front connector and an intermediate portion of the circuit board is arranged to engage with the back connector.

The housing preferably includes a clip arranged to engage with at least one slot of the back connector. The housing is preferably arranged such that the clip is aligned to engage with the at least one slot of the back connector when the front edge of the circuit board is engaged with the front connector. The circuit board preferably includes at least one notch and the housing preferably includes a clip arranged to pass through the at least one notch of the circuit board.

The at least one cable preferably includes at least one of a coaxial cable, a shielded coaxial cable, a twinaxial cable, a twisted pair cable, a shielded twisted pair cable, and a shielded twinaxial cable. Preferably, a conductor of the coaxial cable is electrically connected to a pad of the circuit board and a conductive shield of the coaxial cable is electrically connected to a ground plane of the circuit board.

An epoxy preferably covers the at least one cable and at least one pad of the circuit board. A dielectric constant of the epoxy is preferably within about ±20% of a dielectric constant of the circuit board, for example. Preferably, the epoxy and the circuit board each have a dielectric constant between about 3.9 and about 4.2, for example.

The at least one cable preferably includes a first cable and a second cable. Preferably, electrical traces that are electrically connected to the first cable are arranged only on a top surface of the circuit board. Electrical traces that are electrically connected to the second cable are preferably arranged on a bottom surface of the circuit board. Preferably, a first epoxy covers the first cable and a first pad of the circuit board and a second epoxy covers the second cable and a second pad of the circuit board. Preferably, the at least one cable is electrically connected to at least one pad near the front edge of the circuit board.

The housing preferably includes undercuts arranged to receive at least one edge of the circuit board and alignment pins arranged to be inserted into holes in the circuit board.

The front connector is preferably a 0.5-mm pitch edge-card connector and the circuit board preferably has a routing tolerance of +/−0.001" for engaging with the front connector, for example.

A two-connector system according to a preferred embodiment of the present invention includes a circuit board, a front connector and a back connector connected to the circuit board, and a transceiver connected to the circuit board through the front connector and the back connector. The transceiver includes at least one cable attached to the circuit board and a housing arranged to receive the circuit board. A front edge of the circuit board is arranged to engage with the front connector and an intermediate portion of the circuit board is arranged to engage with the back connector.

A method of manufacturing a transceiver according to a preferred embodiment of the present invention includes computer numerical control routing a circuit board, laser routing at least one edge portion of the circuit board to obtain a tolerance of +/0.001" for mating with a 0.5-mm pitch connector, and arranging the circuit board within a housing.

Preferably, the method further includes fusibly connecting a plurality of cables to a plurality of pads of the circuit board, coating a first epoxy over at least one cable of the plurality of cables and at least one pad of the plurality of pads, and curing the first epoxy.

The method preferably includes, after curing the first epoxy, coating a second epoxy over at least one other cable of the plurality of cables and at least one other pad of the plurality of pads and curing the second epoxy. Alternatively, the method preferably includes, before curing the first epoxy, coating a second epoxy over at least one other cable of the plurality of cables and at least one other pad of the plurality of pads and curing the first epoxy and the second epoxy simultaneously.

The above and other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
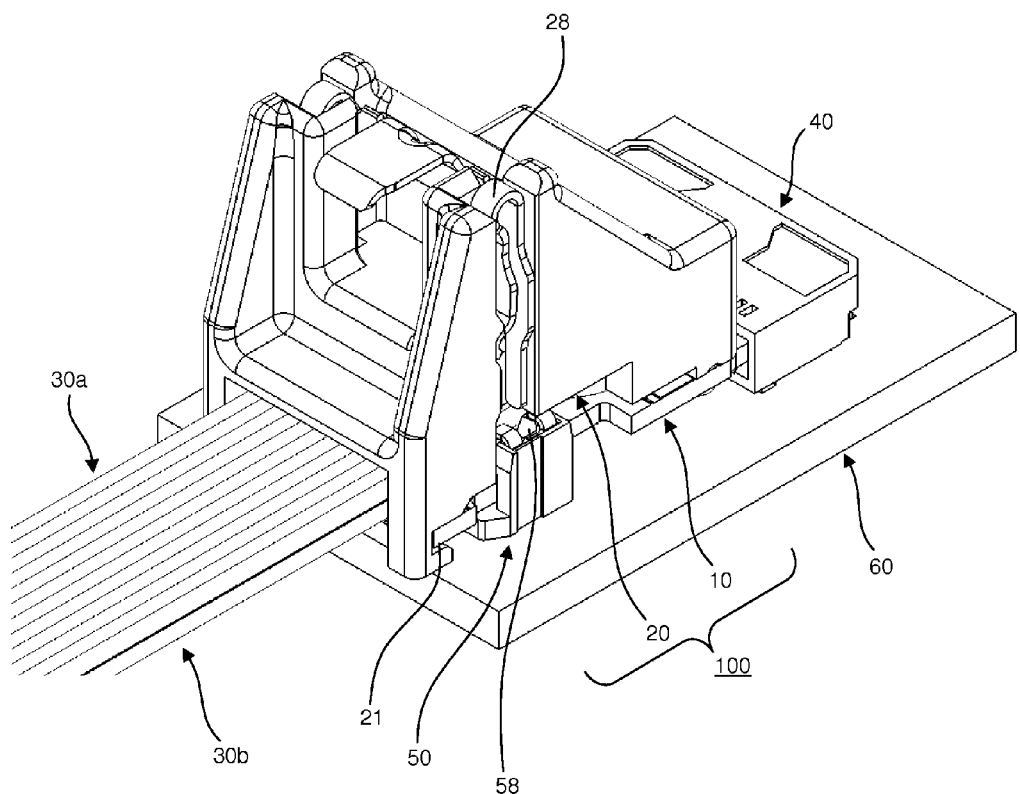
FIG. 1 is a perspective view of a two-connector assembly with a transceiver and a two-connector assembly according to a preferred embodiment of the present invention.
Figure 2:
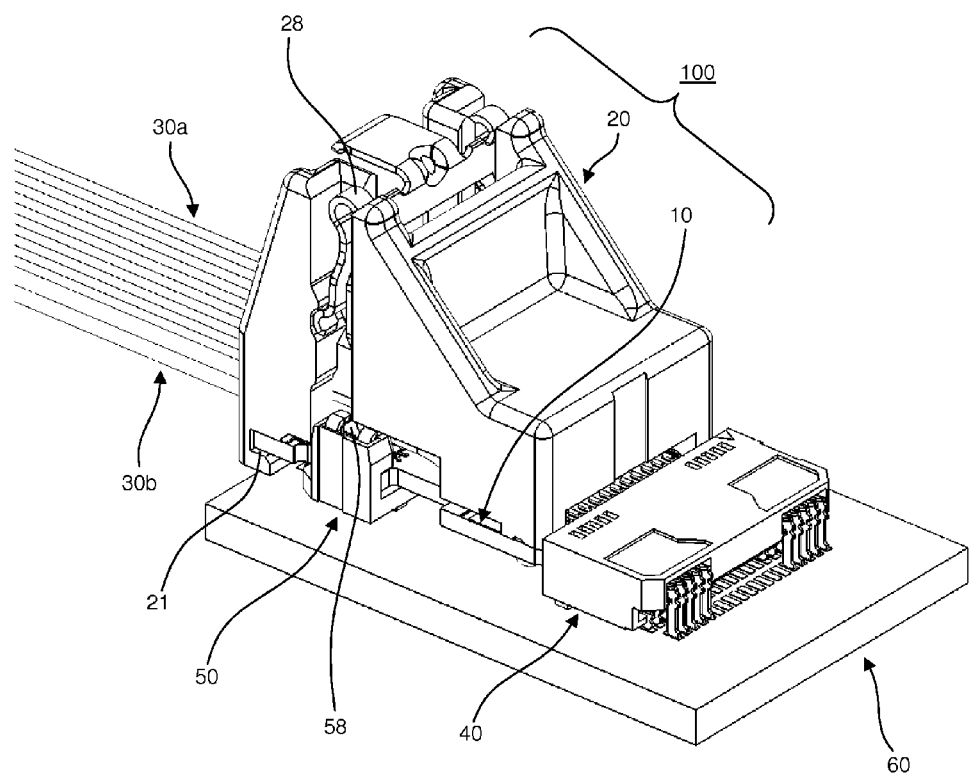
FIG. 2 is another perspective view of the two-connector assembly shown in FIG. 1.

FIGS. 1 and 2 are perspective views of a two-connector assembly with a transceiver 100 and a two-connector assembly that includes a front connector 40 and a back connector 50. The transceiver 100 includes a housing 20 and a circuit board 10 connected to an upper coaxial cable 30a and a lower coaxial cable 30b. The front connector 40 and the back connector 50 are preferably mounted to a substrate 60. Preferably, the front connector 40 is an edge-card connector.

Figure 3:
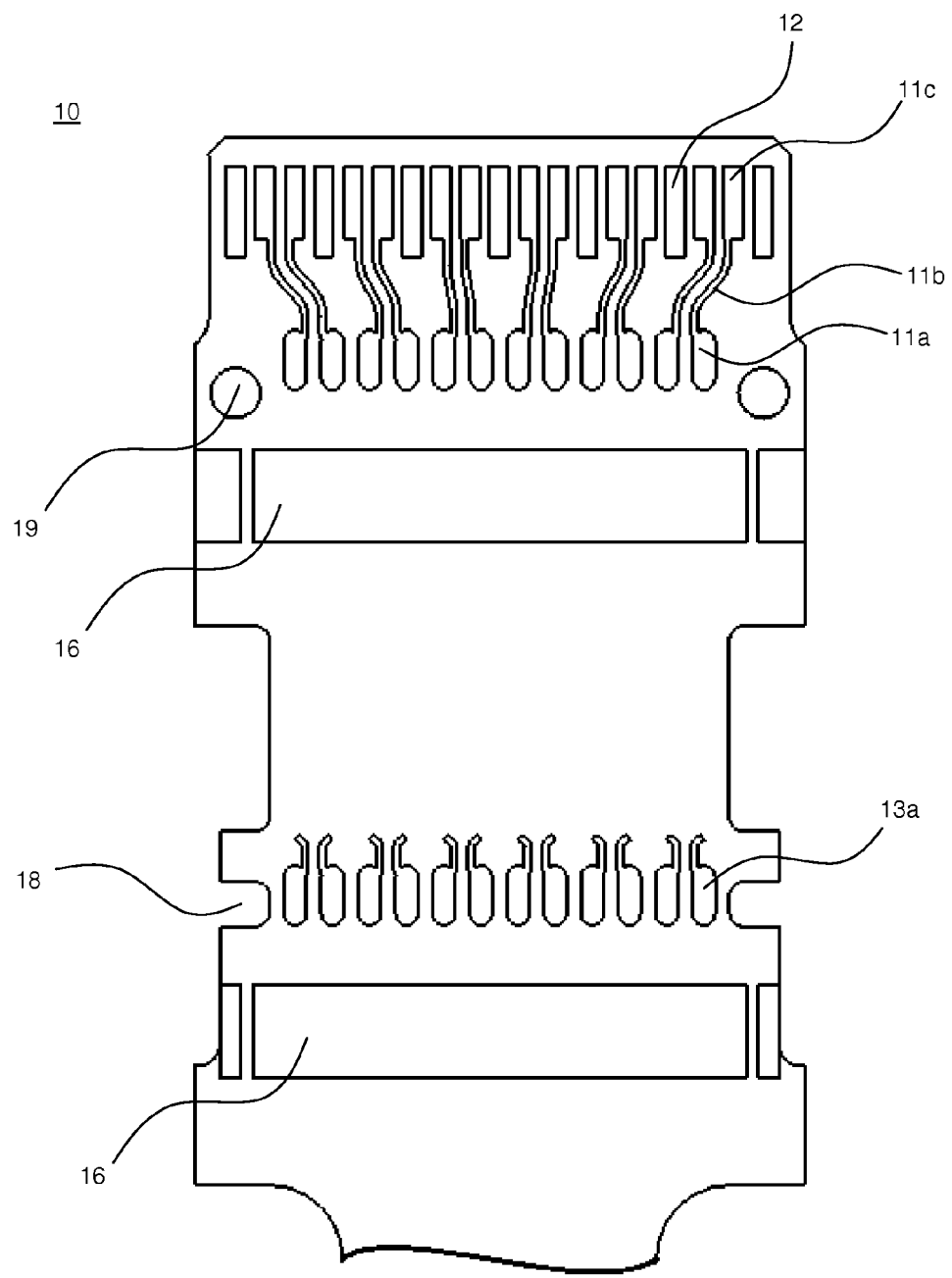
FIG. 3 is a top view of a circuit board of the transceiver shown in FIG. 1.
Figure 4:
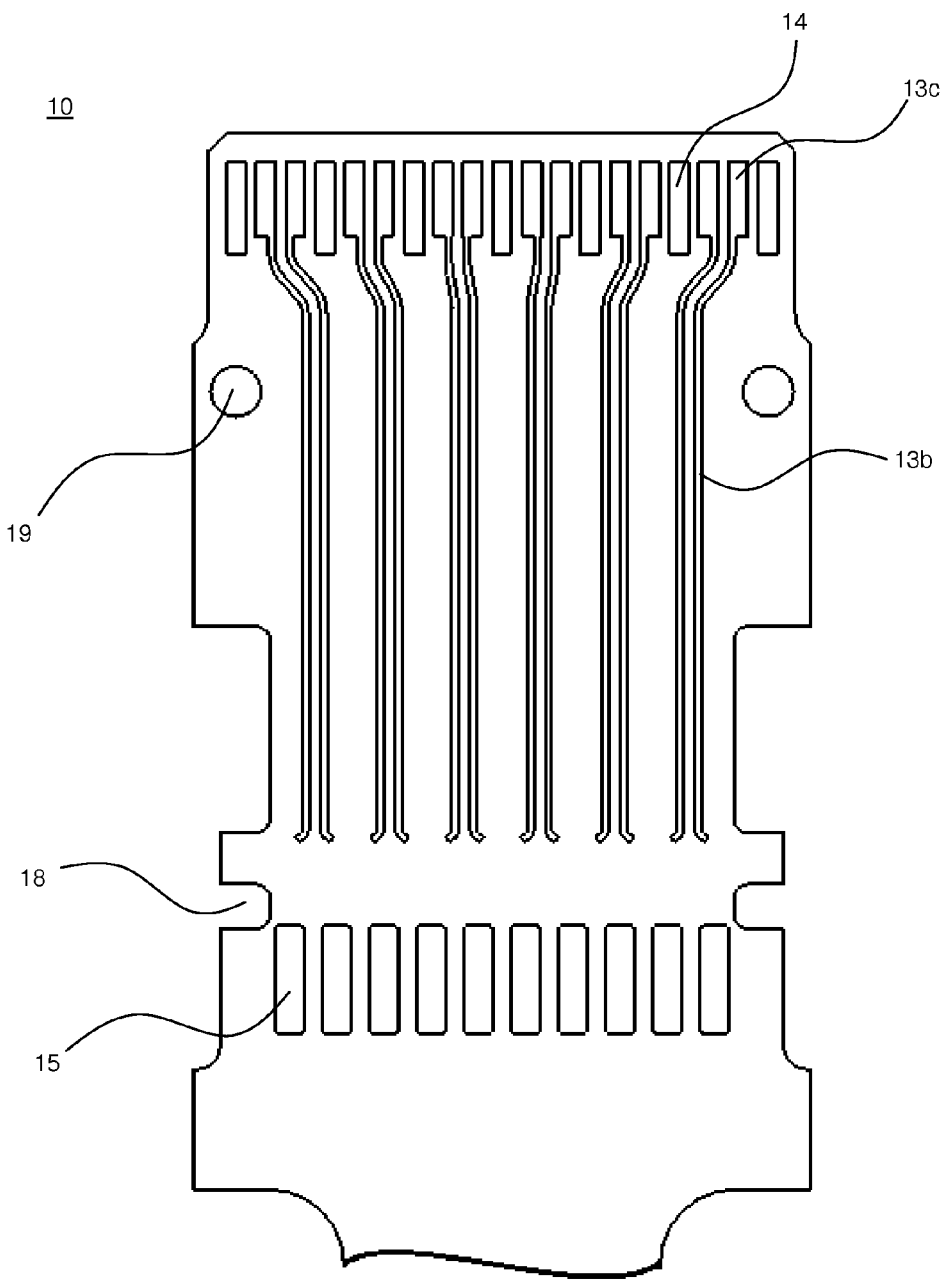
FIG. 4 is a bottom view of the circuit board shown in FIG. 3.

FIGS. 3 and 4 are, respectively, top and bottom views of the circuit board 10 of the transceiver 100. As shown in FIG. 3, a top surface of the circuit board 10 includes upper termination pads 11a, upper traces 11b, upper edge pads 11c, upper ground pads 12, and ground planes 16. As shown in FIG. 4, a bottom surface of the circuit board 10 includes lower termination pads 13a, lower traces 13b, lower edge pads 13c, lower ground pads 14, and, optionally, back pads 15. Accordingly, as described below, the circuit board 10 provides electrical and mechanical connections to the upper coaxial cable 30a and the lower coaxial cable 30b.

As shown in FIGS. 1-4, the housing 20 preferably includes a U-clip 28, and the circuit board 10 preferably includes pass-through notches 18 and holes 19. As described below, the pass-through notches 18 are arranged to receive legs 28a of the U-clip 28, and the holes 19 are arranged to receive heat-staked alignment pins 29 of the housing 20.

Figure 5:
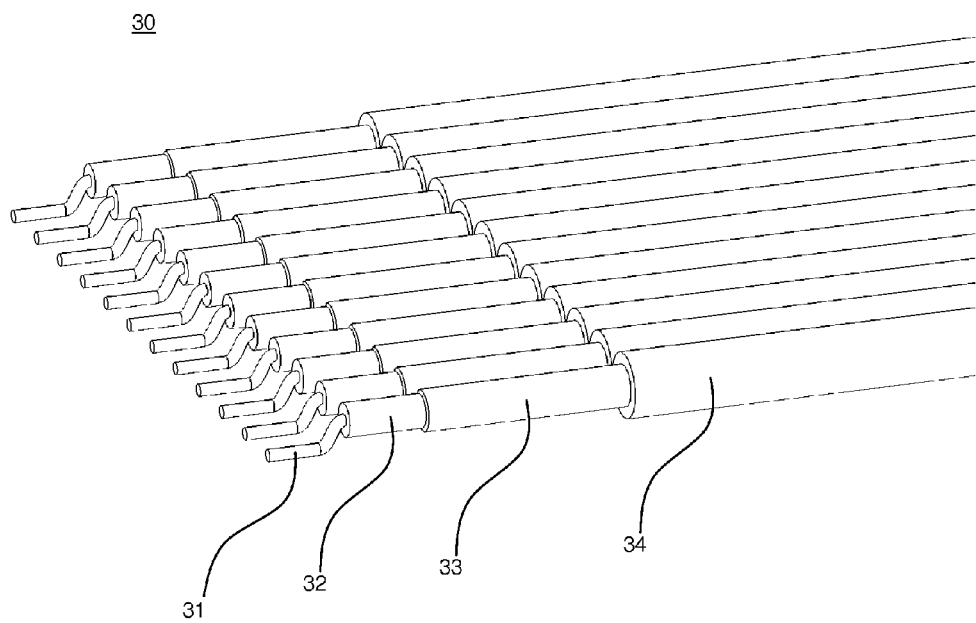
FIG. 5 is a perspective view of a coaxial cable used in the two-connector assembly shown in FIG. 1.

FIG. 5 is a perspective view of a coaxial cable 30 used in the two-connector assembly shown in FIGS. 1 and 2. As shown in FIGS. 1 and 2, two coaxial cables 30 are included in the two-connector assembly as the upper coaxial cable 30a and the lower coaxial cable 30b.

As shown in FIG. 5, the coaxial cable 30 includes conductors 31, insulators 32, conductive shields 33, and outer coatings 34. Preferably, the coaxial cable 30 is a ribbonized coaxial cable, although other types of cables or wiring may be used, for example, a shielded coaxial cable, a twinaxial cable, a twisted pair cable, a shielded twinaxial cable, a shielded twisted pair cable, and the like.

The conductors 31 and the conductive shields 33 are conductive elements of the coaxial cable 30. The conductors 31 are arranged to carry electrical signals, whereas the conductive shields 33 typically provide a ground connection. The conductive shields 33 also provide electrical isolation for the conductors 31 and reduce crosstalk between neighboring conductors 31. Each of the insulators 32 is preferably formed of a dielectric material with a constant or substantially constant cross-section to provide constant or substantially constant electrical properties for its associated conductor 31. The insulators 32 preferably have round, oval, rectangular, or square cross-sectional shapes, but may be formed or defined in any other suitable shape. The outer coatings 34 of the coaxial cable 30 protect the other layers of the coaxial cable 30 and prevent the conductive shields 33 from coming into contact with other electrical components to significantly reduce or prevent occurrence of an electrical short.

FIGS. 6-10 show connections between the circuit board 10 and the coaxial cables 30, including the upper coaxial cable 30a and the lower coaxial cable 30b.

As shown in FIGS. 6-10, a portion of each of the outer coatings 34 and a portion of each of the insulators 32 of each of the upper coaxial cable 30a and the lower coaxial cable 30b is preferably removed to allow the conductive shield 33 to be connected to a corresponding ground plane 16 of the circuit board 10. As shown in FIGS. 6-10, the conductive shields 33 of each of the upper coaxial cable 30a and the lower coaxial cable 30b are preferably commonly connected to ground planes 16 of the circuit board 10, and grounding bars 36 preferably connect the conductive shields 33 to the ground planes 16. The grounding bars 36 are preferably soldered to the circuit board 10 (for example, by hot-bar soldering) to provide a high-capacity electrical ground for the coaxial cables 30 and to help mechanically secure the coaxial cables 30 to the circuit board 10. Furthermore, the conductive shields 33 of the upper coaxial cable 30a and the lower coaxial cable 30b are preferably connected to a common ground through the ground planes 16. However, alternative grounding connections may be used. For example, one or more drain wires (not shown) may be connected to conductive shields 33 and the corresponding ground plane 16, or one or more of the conductors 31 may be used for a ground connection.

As shown in FIGS. 6-10, the conductors 31 of the upper coaxial cable 30a and the lower coaxial cable 30b are preferably fusibly connected (for example, by solder), respectively, to the upper termination pads 11a and the lower termination pads 13a of the circuit board 10.

After electrically connecting one of the coaxial cables 30 to the circuit board 10, epoxy is preferably deposited in the termination region where the coaxial cable 30 connects to the circuit board 10. As shown in FIGS. 6-10, an epoxy-coated termination 35 is provided by depositing epoxy in each of the termination regions where the upper coaxial cable 30a and the lower coaxial cable 30b respectively connect to the upper termination pads 11a and the lower termination pads 13a of the circuit board 10.

Preferably, the epoxy is cured when exposed to an ultraviolet (UV) light, although other types of epoxy may be used (e.g., thermally-cured epoxy, two-part epoxy, light-sensitive epoxy, pressure sensitive epoxy, other suitable epoxy or similar materials). The epoxy may include, for example, glass epoxy, epoxy with aramid fibers, a blend of epoxy and bis-maleimide-triazine, and the like. A non-exhaustive list of possible epoxy formulations includes LOCTITE 3705, LOCTITE 3128, ECCOBOND E-3200, LOCTITE 3593, LOCTITE 3943, and LOCTITE PC18M, for example. Preferably, the epoxy has a dielectric constant that is similar to the dielectric constant of the circuit board 10 in order to reduce discontinuities, as described below. Further, the epoxy preferably has a dielectric constant that is consistent throughout the epoxy.

Accordingly, the portion of the coaxial cables 30 that is removed to attach the coaxial cables 30 to the circuit board 10 is surrounded by the epoxy, which has a dielectric constant similar to the dielectric constant of the circuit board 10, rather than air. Preferably, the dielectric constant of the epoxy is within about ±20% of the dielectric constant of the circuit board 10, for example. More preferably, the epoxy and the circuit board 10 each have a dielectric constant between about 3.9 and about 4.2, for example. However, the range of values for the dielectric constants of the epoxy and the circuit board 10 is not limited thereto, and may be selected, for example, according to the specific materials for the components used in the two-connector assembly or according to operating conditions or other factors or preferences. The similarity in the dielectric constants of the epoxy and the circuit board 10 reduces impedance discontinuities when signals are transmitted between the circuit board 10 and the coaxial cables 30. Reducing impedance discontinuities increases signal integrity performance. As another example, the epoxy may be selected so that the dielectric constant of the epoxy matches the dielectric constant of the insulators 32 of the coaxial cable 30. Furthermore, instead of using an epoxy, it is also possible to use bonding agents, underfills, potting compounds, glues, fillers, encapsulants, sealants, and other suitable materials, for example.

Figure 8:
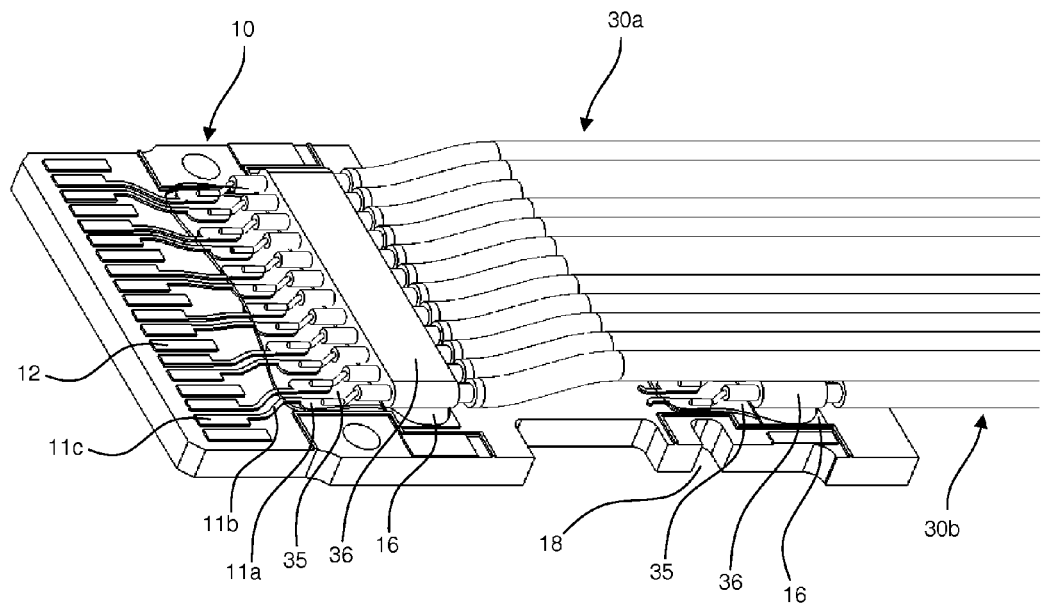
FIG. 8 is a perspective view of an upper coaxial cable and the lower coaxial cable connected to the circuit board shown in FIG. 3.
Figure 10:
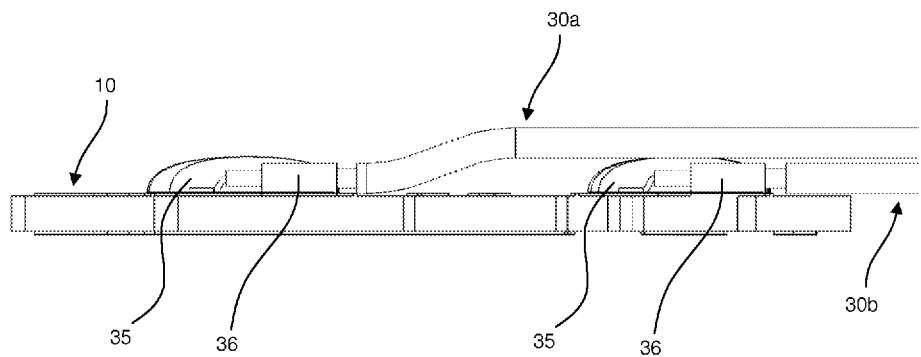
FIG. 10 is a top side view of the upper coaxial cable and the lower coaxial cable connected to the circuit board shown in FIG. 3.

As shown in FIGS. 8 and 10, the upper coaxial cable 30a and the lower coaxial cable 30b are connected to the circuit board 10 in a "shingled" manner so that the upper coaxial cable 30a is located over the contacts associated with the lower coaxial cable 30b. For example, shingling the upper and lower coaxial cables 30a and 30b, according to a preferred embodiment of the present invention, provides 24 wires (i.e., each of the conductors 31 of the upper and lower coaxial cables 30a and 30b) in an area where a typical transceiver would only include 12 wires.

The lower coaxial cable 30b is preferably soldered to the circuit board 10, a first portion of epoxy is placed in the termination region of the lower coaxial cable 30b, and the first portion of epoxy is cured (e.g., by exposing the epoxy to a UV light) to provide an epoxy-coated termination 35. Next, the upper coaxial cable 30a is soldered to the circuit board 10, a second portion of epoxy is placed in the termination region for the upper coaxial cable 30a, and the second portion of epoxy is cured to provide another epoxy-coated termination 35. Although the upper coaxial cable 30a and the lower coaxial cable 30b could be soldered and/or epoxied simultaneously to save manufacturing time, sequentially soldering the upper coaxial cable 30a and the lower coaxial cable 30b provides a better mechanical connection with a reduced chance of introducing defects into the termination regions because the coaxial cables 30 do not have to be bent as compared with simultaneous soldering of the upper coaxial cable 30a and the lower coaxial cable 30b. That is, if the coaxial cables are simultaneously soldered, at least the upper coaxial cable 30a needs to be bent away from the circuit board 10 during soldering of the lower coaxial cable 30b, so that the outer coatings 34 of the upper coaxial cable 30a are not damaged by the soldering of the lower coaxial cable 30b. Bending of the coaxial cables 30 may result in defects in the termination regions and may reduce performance of the coaxial cables 30 due to mechanical fatigue.

A preferred embodiment of the present invention reduces the length of the outer coatings 34 and insulators 32 of the coaxial cables 30 that needs to be removed to attach the coaxial cables 30 to the circuit board 10. In particular, the high-density connection for the coaxial cables 30 provided by the upper and lower termination pads 11a and 13a, the ground planes 16, and the epoxy allows for the length of the outer coatings 34 of the coaxial cables 30 that needs to be stripped to be shorter than that of cables used in known transceivers. In particular, the epoxy provides a mechanical strain relief for the solder joints between the upper and lower termination pads 11a and 13a and the conductors 31 of the coaxial cables 30, so as to allow for a shorter region of the coaxial cables 30 to be soldered. Providing shorter termination lengths improves high-speed performance by reducing the size of the area where signal discontinuities are most likely to arise. Preferably, the length of each of the exposed portions of the insulators 32 and the length of each of the exposed portions of the conductors 31 is less than about 0.050", and is more preferably less than about 0.030", for example. Accordingly, since the present preferred embodiment of the present invention provides a shorter length of an unshielded portion of each of the conductors 31 of coaxial cables 30, impedance discontinuities are reduced in the termination region. Reducing the impedance discontinuities increases the signal integrity performance.

Each signal transmitted on one of the conductors 31 is received at the circuit board 10 and routed through one of the termination pads (i.e., upper termination pads 11a or lower termination pads 13a). The upper coaxial cable 30a is preferably terminated to the upper termination pads 11a, and the lower coaxial cable 30b is preferably terminated to lower the termination pads 13a. Each signal is further routed through one of the traces (i.e., upper traces 11b or lower traces 13b) that are connected to the corresponding upper termination pads 11a or lower termination pads 13a. Each signal is still further routed through one of the edge pads (i.e., upper edge pads 11c or lower edge pads 13c) that are located at the edge of the circuit board 10. Preferably, the upper coaxial cable 30a and the lower coaxial cable 30b each include pairs of conductors 31, for example, so that differential signals can be transmitted on respective pairs of conductors 31. However, according to a preferred embodiment of the present invention, the conductors 31 carry single-ended signals, or a combination of both differential signals and single-ended signals.

Figure 6:
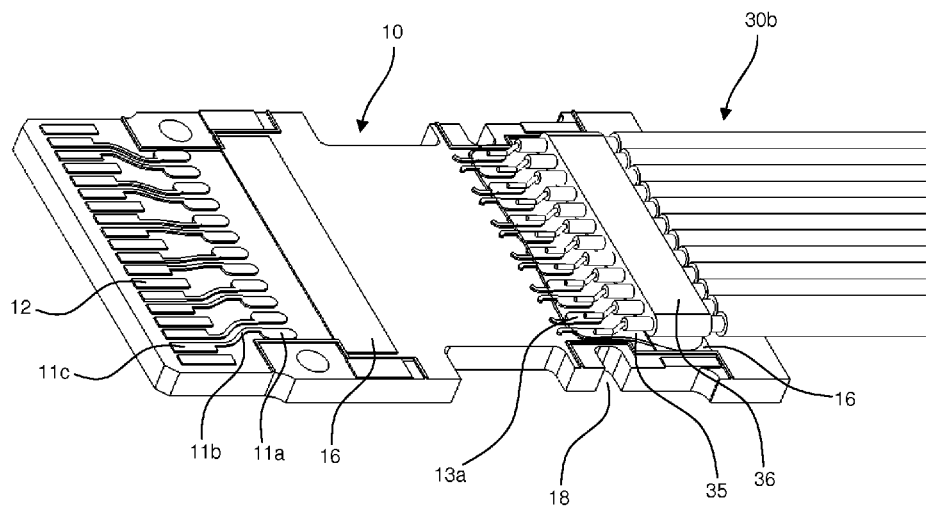
FIG. 6 is a perspective view of a lower coaxial cable connected to the circuit board shown in FIG. 3.
Figure 7:
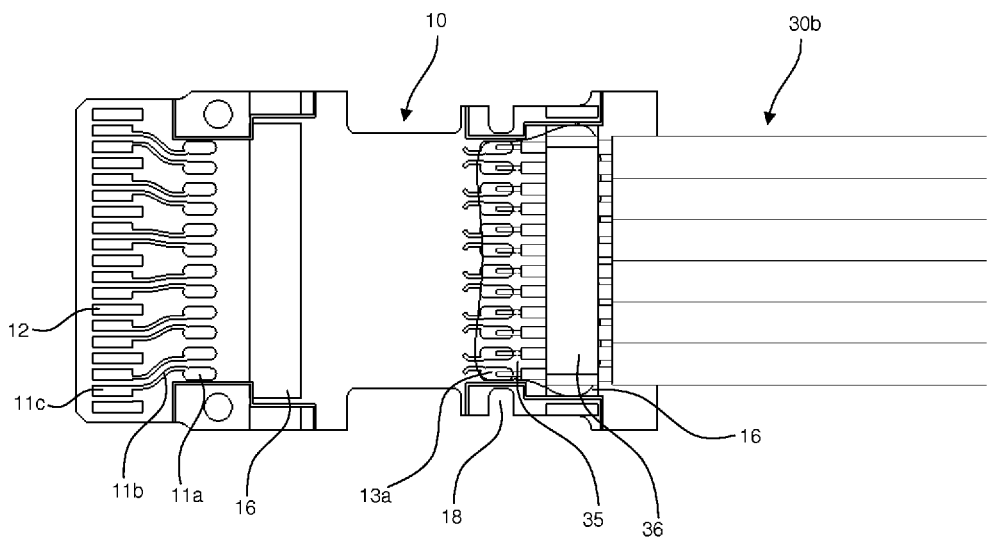
FIG. 7 is a top view of the lower coaxial cable connected to the circuit board shown in FIG. 3.
Figure 9:
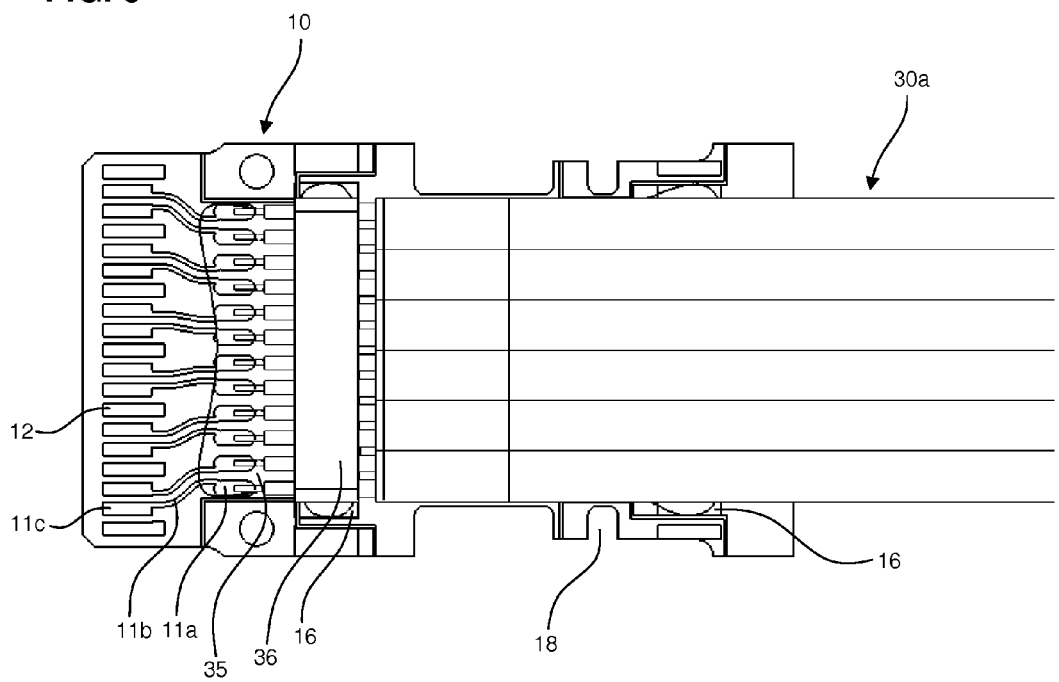
FIG. 9 is a top view of the upper coaxial cable and the lower coaxial cable connected to the circuit board shown in FIG. 3.

The signals of the upper coaxial cable 30a are preferably routed through upper termination pads 11a, upper traces 11b, and upper edge pads 11c on the top of the circuit board 10, as shown in FIGS. 3, 8, and 9. Similarly, the signals of the lower coaxial cable 30b are preferably routed through lower termination pads 13a on the top of the circuit board 10 and lower traces 11b and lower edge pads 11c on the bottom of the circuit board 10, as shown in FIGS. 4, 6, and 7. Preferably, the lower traces 11b on the bottom of the circuit board 10 are connected to lower termination pads 13a on the top circuit board 10 by vias. As shown in FIGS. 16-20, the upper edge pads 11c on the top of the circuit board 10 mate with corresponding upper contacts 41 within the front connector 40 when the circuit board 10 of the transceiver 100 is inserted into the front connector 40. Similarly, the lower edge pads 13c on the bottom of the circuit board 10 mate with corresponding lower contacts 43 within the front connector 40 when the circuit board 10 of the transceiver 100 is inserted into the front connector 40.

As shown in FIGS. 3 and 4, the upper traces 11b on the top of the circuit board 10 have shorter lengths than the lower traces 13b on the bottom of the circuit board 10. Accordingly, critical signals can be routed through the upper coaxial cable 30a, the upper termination pads 11a, the upper traces 11b, and the upper edge pads 11c (i.e., only along the top of the circuit board 10) to minimize the distance that the critical signals travel through traces of the circuit board 10, so as to reduce crosstalk, interference, noise, and the like. Accordingly, less critical signals can be routed through the lower coaxial cable 30b, the lower termination pads 13a, the lower traces 13b that are typically longer the upper traces 11b, and the lower edge pads 13c (i.e., partially along the bottom of the circuit board 10).

However, the preferred embodiments of the present invention are not limited to the specific arrangement described above. According to preferred embodiments of the present invention, balanced signal transmission lengths may be provided for the signals of the upper coaxial cable 30a and the lower coaxial cable 30b. For example, if the upper contacts 41 are longer than the lower contacts 43, then the signals of the upper coaxial cable 30a and the lower coaxial cable 30b will have similar overall signal transmission lengths through the circuit board 10 and the front connector 40. As another example, the lower coaxial cable 30b may be soldered to the bottom of the circuit board 10 to minimize the distance that the signals of the lower coaxial cable 30b travel through traces of the circuit board 10.

As shown in FIGS. 3 and 4, the circuit board 10 preferably includes upper ground pads 12 arranged between each pair of upper edge pads 11c and lower ground pads 14 arranged between each pair of lower edge pads 13c, such that 19 total edge pads are defined on each of the top and the bottom of the circuit board 10, for example. According to a preferred embodiment of the present invention, the pairs of upper and lower edge pads 11c and 13c with ground pads 12 and 14 interposed between the pairs of the upper and lower edge pads 11c and 13c provide high signal integrity while still maintaining a 0.5-mm pitch for mating with a 0.5-mm-pitch edge-card connector such as front connector 40, for example. The back pads 15 preferably provide ground connections for the circuit board 10, via back contacts 55 of the back connector 50. However, according to a preferred embodiment of the present invention, the back pads 15 may carry signals or power, or the back pads 15 may have no electrical connection. Furthermore, the back pads 15 may have any combination of the above, such that at least one of the back pads carries signals or power while at least one of the back pads has no electrical connection. According to a preferred embodiment of the present invention, the circuit board 10 may not include the back pads 15, for example, to reduce manufacturing costs.

Figure 11:
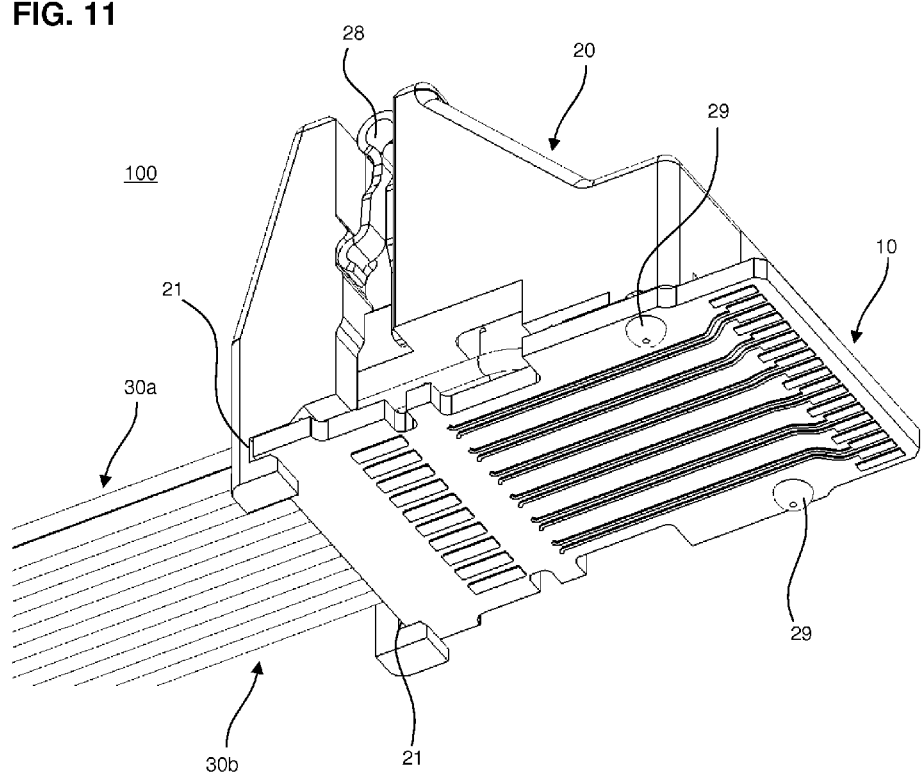
FIG. 11 is a bottom perspective view of the transceiver shown in FIG. 1.

FIG. 11 is a bottom perspective view of the transceiver 100. A preferred embodiment of the present invention includes undercuts 21 and alignment pins 29 in the housing 20 of the transceiver 100 to secure the housing 20 to the circuit board 10 as shown in FIG. 11. The undercuts 21 in the housing 20 receive the end of the circuit board 10 that is opposite to the upper and lower edge pads 11c and 13c and help prevent the circuit board 10 from being disconnected with the housing 20 when the transceiver 100 is inserted into the front connector 40. The alignment pins 29 are received by holes 19 of the circuit board 10 and provide a low-cost, secure mechanical connection between the housing 20 and the circuit board 10. The alignment pins 29 can be heat-staked and/or ultrasonically welded after being inserted into the holes 19 of the circuit board 10. The preferred embodiments of the present invention are not limited to the undercuts 21 and the alignment pins 29 in the housing 20 as described above, as other features may be used to secure the housing 20 to the circuit board 10.

Figure 12:
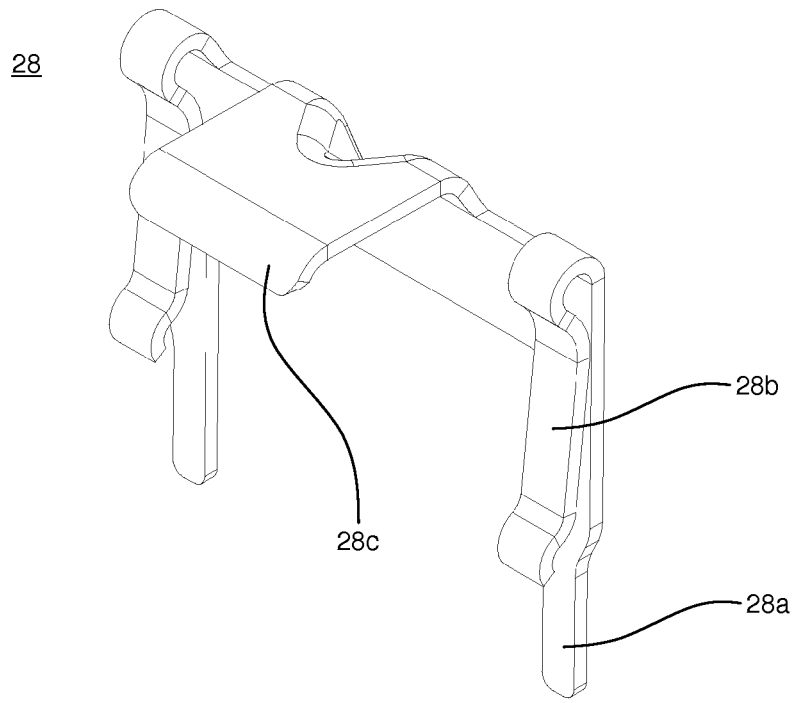
FIG. 12 is a top perspective view of a U-clip of the transceiver shown in FIG. 1.
Figure 13:
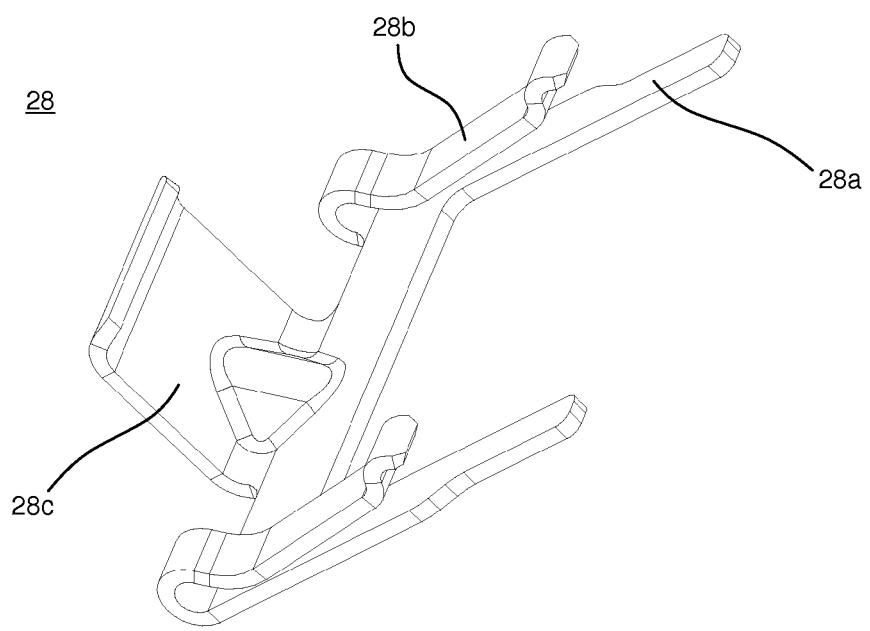
FIG. 13 is a bottom perspective view of the U-clip shown in FIG. 12.

FIGS. 12 and 13 are perspective views the U-clip 28. A preferred embodiment of the present invention includes the U-clip 28, as shown in FIGS. 12 and 13, in the housing 20 of the transceiver 100. The U-clip 28 includes legs 28a that are arranged to be received by pass-through notches 18 in the circuit board 10, as shown in FIGS. 3, 4, and 6-8. Preferably, the U-clip 28 includes a tab 28c such that a force from, for example, a human finger, can push or pull the legs 28a of the U-clip 28 into or from the pass-through notches 18 in the circuit board 10. When the U-clip 28 is engaged, the legs 28a of the U-clip 28 engage with slots 58 in the back connector 50 to secure the transceiver 100 to the back connector 50, as shown in FIGS. 1, 2, 21, and 22 and further described in detail below.

Figure 14:
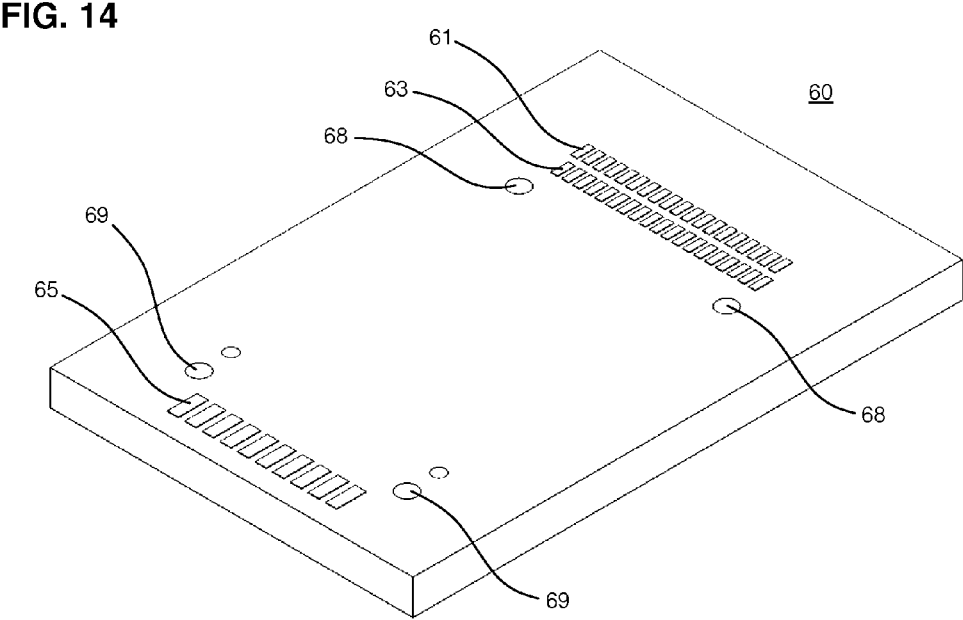
FIG. 14 is a top perspective view of a substrate of the two-connector assembly shown in FIG. 1.
Figure 15:
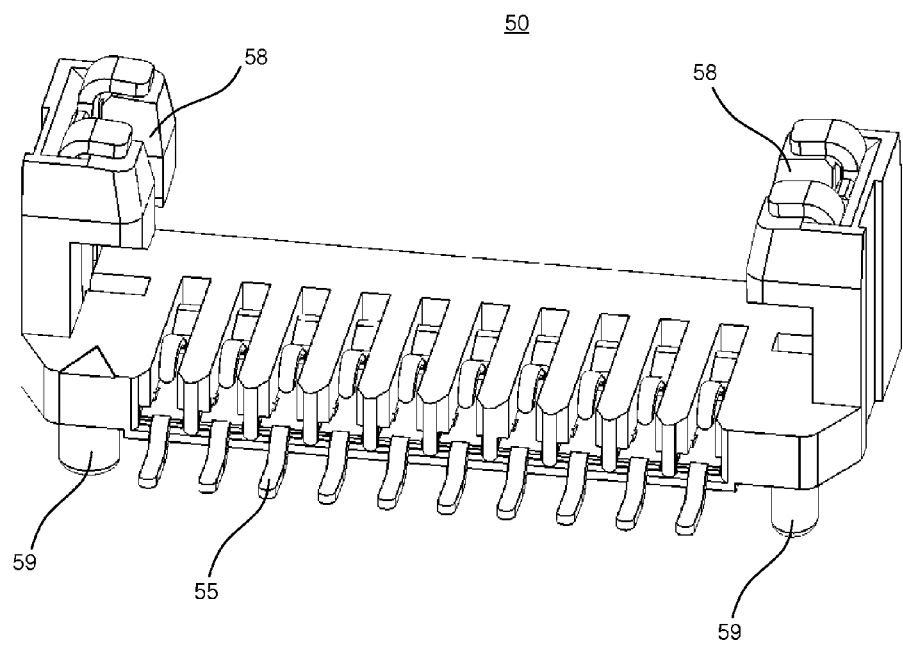
FIG. 15 is a top perspective view of a back connector of the two-connector assembly shown in FIG. 1.

FIG. 14 shows a top perspective view of the substrate 60. FIG. 15 shows a top perspective view of a back connector 50, and FIG. 16 shows a top perspective view of the front connector 40.

As shown in FIG. 14, the substrate 60 includes three rows of pads: a row of upper substrate pads 61, a row of lower substrate pads 63, and a row of back substrate pads 65. Further, the substrate 60 preferably includes front alignment holes 68 and back alignment holes 69.

As shown in FIG. 15, the back connector 50 includes back contacts 55 and slots 58. Further, the back connector 50 preferably includes alignment posts 59. Preferably, the alignment posts are arranged to be inserted into the back alignment holes 68 of the substrate 60 to locate the back connector 50 on the substrate 60. Furthermore, the back alignment holes 68 and the alignment posts 59 may be polarized to ensure proper alignment and orientation of the back connector 50 on the substrate 60. The back substrate pads 65 are preferably fusibly connected (for example, by solder) to the back contacts 55 to provide a secure electrical and mechanical connection between the back connector 50 and the substrate 60.

Figure 16:
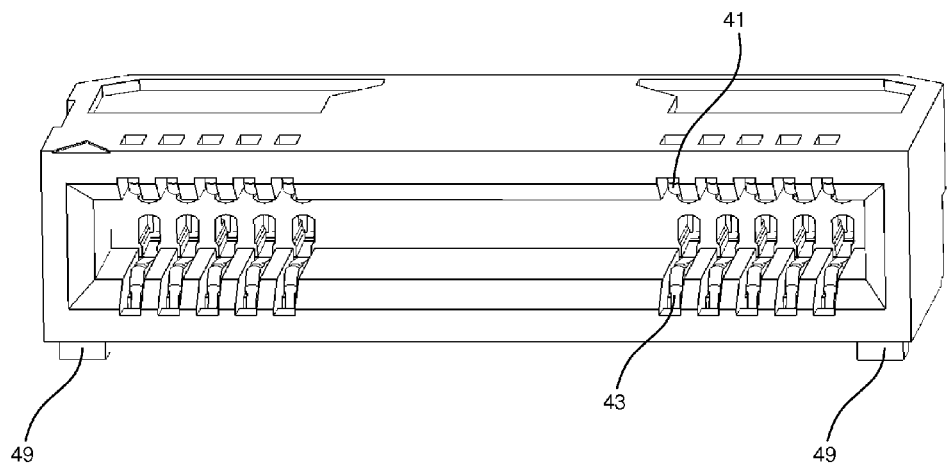
FIG. 16 is a top perspective view of the front connector of the two-connector assembly shown in FIG. 1.
Figure 17:
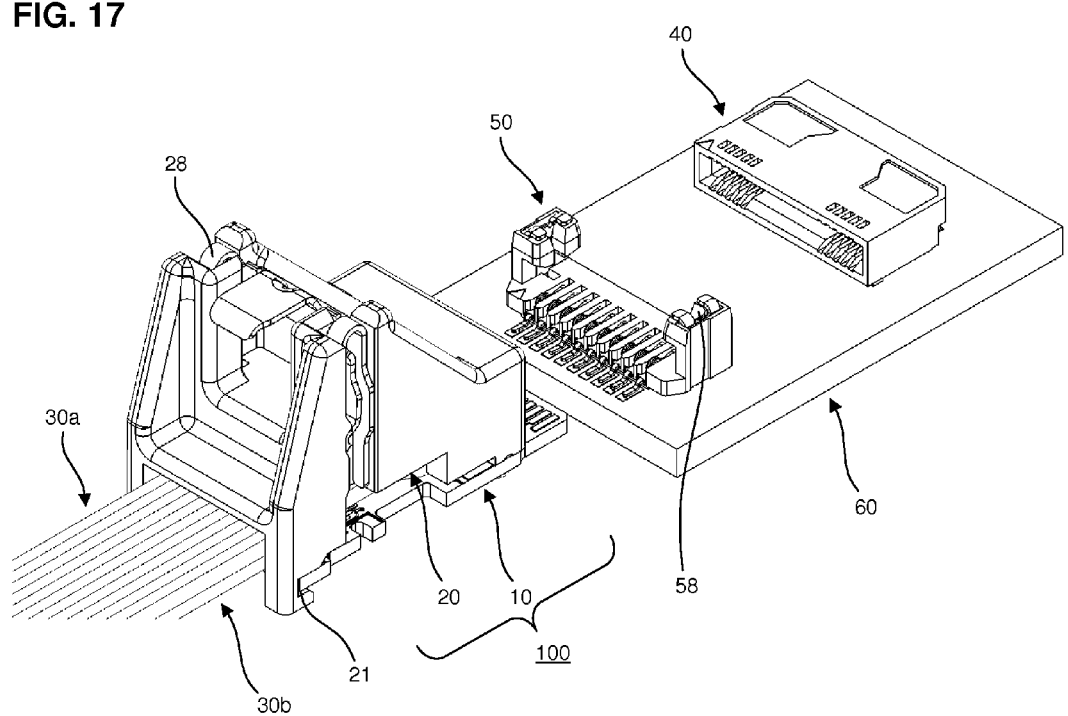
FIG. 17 is a top-front perspective view of the two-connector assembly of FIG. 1 before the transceiver is engaged with the two-connector assembly.
Figure 18:
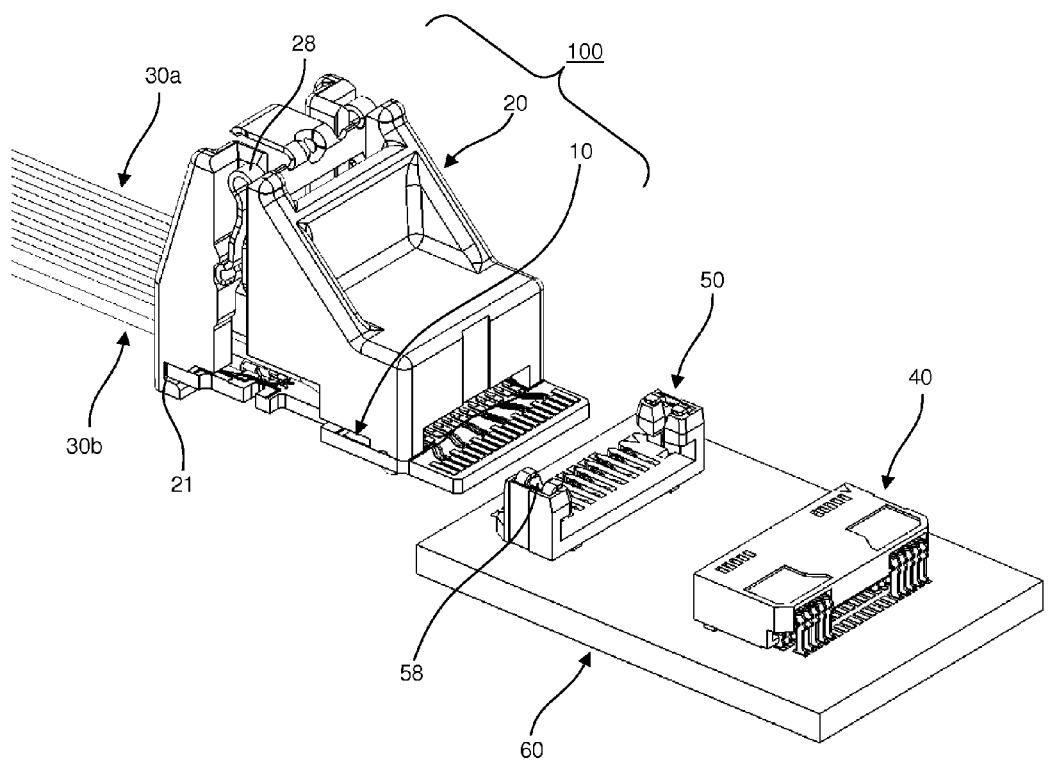
FIG. 18 is a rear-front perspective view of the two-connector assembly of FIG. 1 before the transceiver is engaged with the two-connector assembly.
Figure 19:
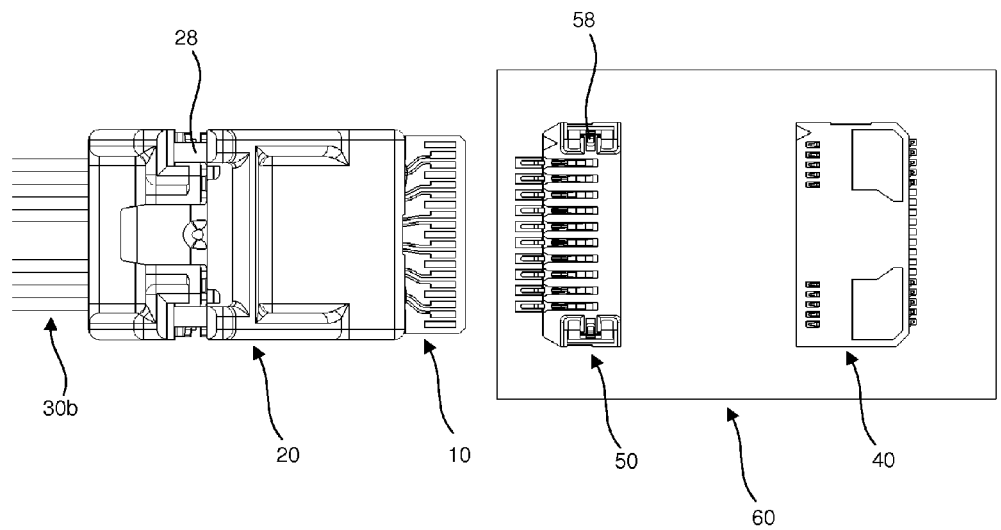
FIG. 19 is a top view of the two-connector assembly of FIG. 1 before the transceiver is engaged with the two-connector assembly.
Figure 20:
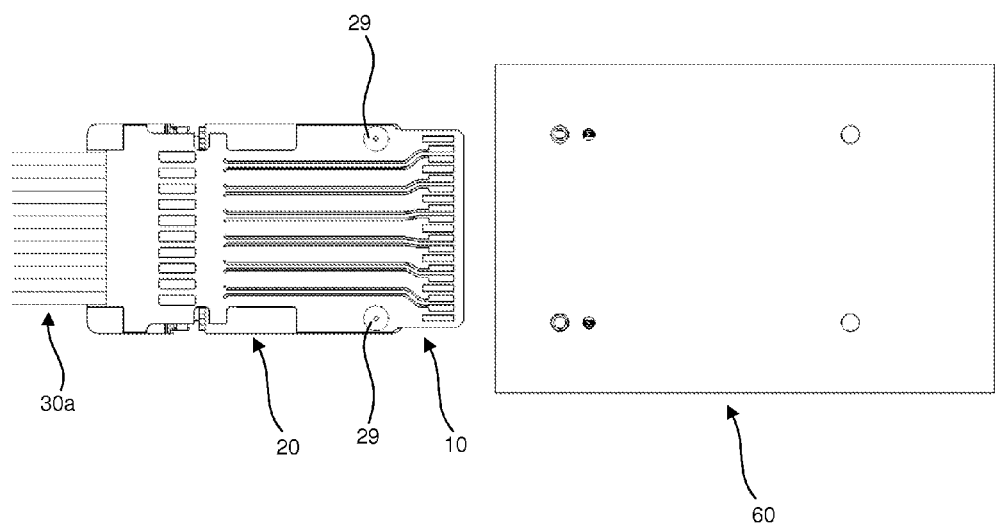
FIG. 20 is a bottom view of the two-connector assembly of FIG. 1 before the transceiver is engaged with the two-connector assembly.

As shown in FIG. 16, the front connector 40 includes upper contacts 41 and lower contacts 43. It is noted that, for clarity, not all of the upper contacts 41 and lower contacts 43 are shown in FIG. 16. Further, the front connector 40 preferably includes spacers 49. The spacers 49 may be arranged to be inserted into the front alignment holes 69 of the substrate 60 to locate the front connector 40 on the substrate 60. The front alignment holes 69 and the spacers 49 may be polarized to ensure proper alignment and orientation of the front connector 40 on the substrate 60. The upper substrate pads 61 and the lower substrate pads 63 are preferably fusibly connected (for example, by solder), respectively, to the upper contacts 41 and the lower contacts 43 to provide a secure electrical and mechanical connection between the front connector 40 and the substrate 60.

FIGS. 17-20 show views of the front connector 40 and the back connector 50 mounted on the substrate 60, prior to engagement with the transceiver 100.

As shown in FIGS. 17-20, the front connector 40, the back connector 50, and the transceiver 100 are arranged so that the upper edge pads 11c of the circuit board 10 align and engage with the upper contacts 41 of the front connector 40 when the transceiver 100 is inserted into the front connector 40. Similarly, the front connector 40, the back connector 50, and the transceiver 100 are arranged so that the lower edge pads 13c of the circuit board 10 align and engage with the lower contacts 43 of the front connector 40 when the transceiver 100 is inserted into the front connector 40. Further, the front connector 40, the back connector 50, and the transceiver 100 are preferably arranged so that the back pads 15 of the circuit board 10 align and engage with the back contacts 55 of the back connector 50 when the transceiver 100 is inserted into the back connector 50. However, this alignment is not needed if the back pads 15 are not included on the circuit board 10.

Figure 21:
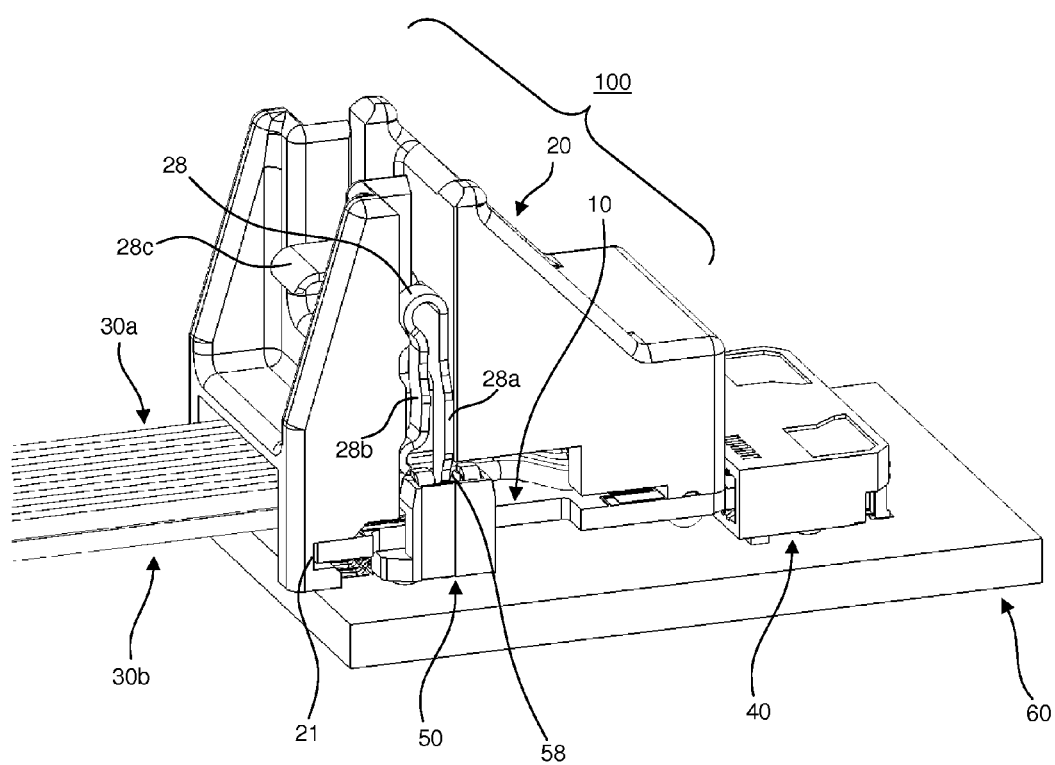
FIG. 21 is a top perspective view of the two-connector assembly shown in FIG. 1 with the U-clip of the transceiver engaged with the back connector and the circuit board.
Figure 22:
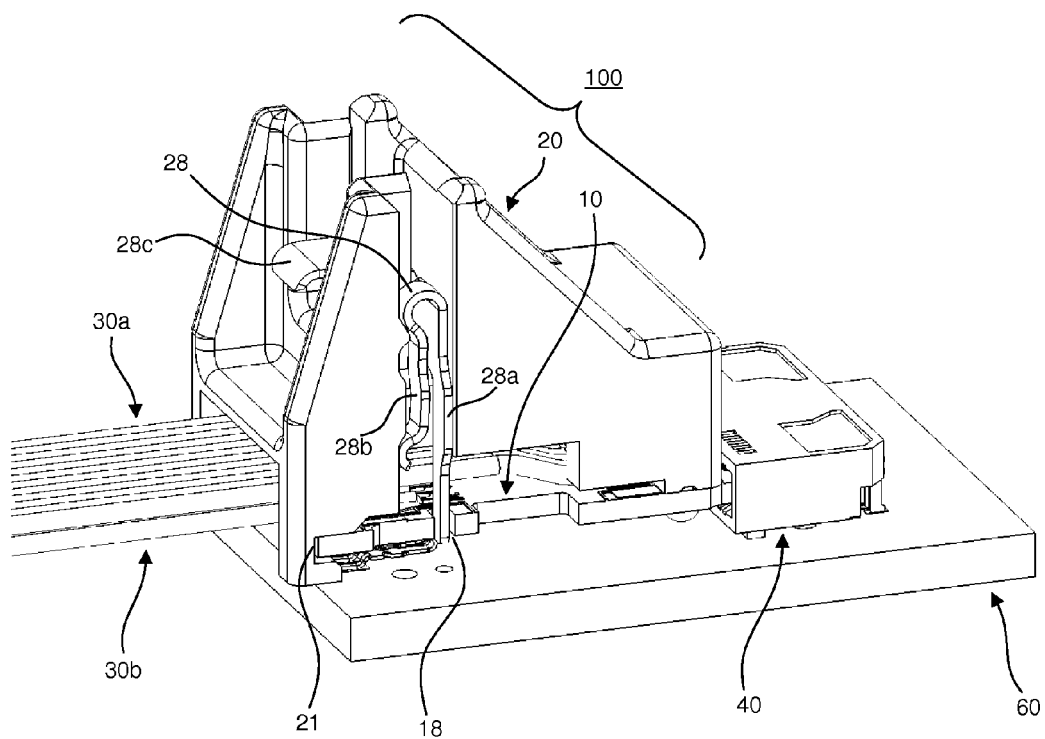
FIG. 22 is a top perspective view of the two-connector assembly shown in FIG. 1 with the U-clip of the transceiver engaged with the circuit board, where the back connector is not shown.

FIGS. 21 and 22 show top perspective views of the two-connector assembly when the transceiver 100 is engaged with the front connector 40 and the back connector 50, and the U-clip 28 is engaged with the circuit board 10 and the back connector 50. The back connector 50 is not shown in FIG. 22 to illustrate the insertion of the U-clip 28 with the circuit board 10.

As shown in FIG. 21, the legs 28c of the U-clip 28 are insertable into the slots 58 of the back connector 50 to secure the transceiver 100 to the back connector 50 and the front connector 40. As shown in FIG. 22, the legs 28c of the U-clip 28 are also insertable into the pass-through notches 18 of the circuit board 10 to help prevent the circuit board 10 from being disconnected from the housing 20, the front connector 40, and the back connector 50.

When the legs 28c of the U-clip 28 are engaged with the slots 58 of the back connector 50 and the pass-through notches 18 of the circuit board 10, movement of the circuit board 10 (e.g., twisting of the circuit board 10 within the front connector 40) is restricted. Accordingly, secure electrical connections between the edge pads 11c and 13c of the circuit board 10 and the contacts 41 and 43 of the front connector 40 may be achieved, even when using a small pitch such as a 0.5-mm pitch, for example. Furthermore, by restricting movement of the circuit board 10, degradation and wear of the edge pads 11c and 13c of the circuit board 10 and the contacts 41 and 43 of the front connector 40 is significantly reduced or prevented.

The housing 20 preferably includes ridges or depressions that press against the arm 28b of the U-clip 28 to help prevent undesirable disengagement of the legs 28a from the slots 58.

Figure 23A:
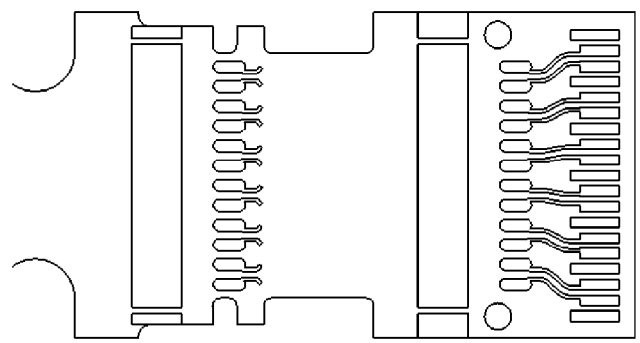
FIGS. 23A-23C are top views showing routing of the circuit board shown in FIG. 3.
Figure 23B:
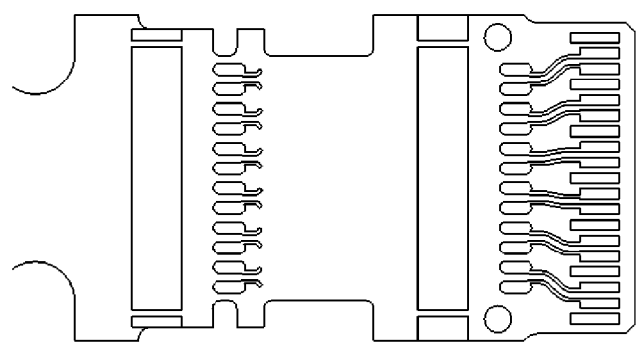
Figure 23C:
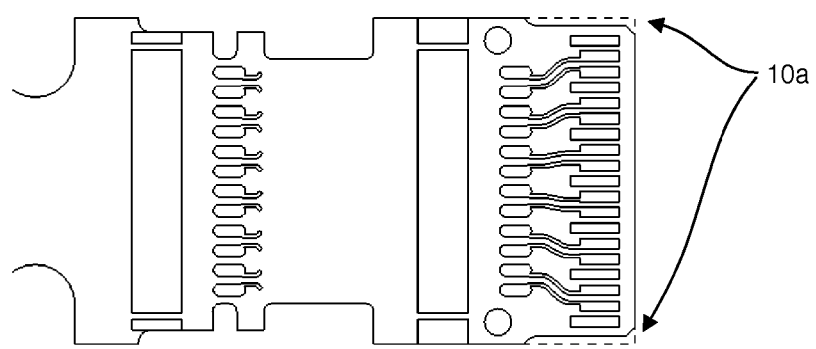

FIGS. 23A-23C show the top of the circuit board 10. A preferred embodiment of the present invention preferably uses a two-step manufacturing process of the circuit board 10 to improve the overall width tolerance of the circuit board 10 from +/−0.005" to +/−0.001", for example. The first step is computer numerical control (CNC) routing the majority of the perimeter of the circuit board 10', as shown in FIG. 23A. The second step is laser routing the width region of the circuit board to provide the 0.5-mm pitch for the circuit board 10, as shown in FIG. 23B. As shown in FIG. 23C, the material 10a removed by the laser routing provides a precision fit for the circuit board 10 into the front connector 40. The laser routing provides a +/−0.001" tolerance, and is limited to a small region of the circuit board 10 because laser routing is more expensive than CNC routing. Further, laser routing is preferably applied to only the end of the circuit board 10 that includes the upper and lower edge pads 11c and 13c, since a tight tolerance is only needed for the portion of the circuit board 10 that engages with a 0.5-mm pitch edge-card connector such as front connector 40. A reliable electrical connection may be achieved between the circuit board 10 and the back connector 50 using only CNC routing, since the back connector 50 preferably has a tolerance of about +/−0.005", for example.

A preferred embodiment of the present invention preferably includes both the front connector 40 and the back connector 50, as shown in FIGS. 1, 2, 17-19, 21, and 22. However, only the front edge connector 40 may be used to transmit signals. That is, the back connector 50 may function only to help mechanically secure the circuit board 10 to a substrate 60 on which the front connector 40 and the back connector 50 are mounted. Furthermore, signals may also be routed along only one of the top and bottom of the circuit board 10. For example, the signals of the upper coaxial cable 30a can be routed along the top of the circuit board 10, and the signals of the lower coaxial cable 30b can be routed through the back connector 50 instead of being routed through the lower traces 13b on the bottom of the circuit board 10.

The front connector 40 and the back connector 50, according to a preferred embodiment of the present invention, may connect with an optical transceiver. Preferably, the optical transceiver includes the circuit board shown in FIGS. 3 and 4. Preferably, the optical transceiver also includes an optical engine arranged to convert optical signals into electrical signals and to convert electrical signals into optical signals. The optical transceiver preferably further includes a heatsink.

The back connector 50 is preferably a compression-type connector and may be implemented as a zero-insertion-force connector, as shown in FIG. 15. However, other one-piece interface or connector solutions could also be used for the back connector 50.

Instead of using the circuit board 10 and the substrate 60, it is also possible to use any suitable element on which electrical components can be attached. Furthermore, the circuit board 10 and the substrate 60 may be arranged to include stepped planes. For example, the substrate 60 could include stacked substrates so that the back substrate pads 65 are included in a different plane from the upper and lower substrate pads 61 and 63.

A preferred embodiment of the present invention preferably uses epoxy in the termination region of the circuit board 10 to improve both the electrical and mechanical connections between the coaxial cables 30 and the circuit board 10. However, the epoxy coated terminations 35 may only be included in the termination region of only one of the coaxial cables 30 and/or in only a portion of the termination region. Furthermore, bonding agents, encapsulants, adhesives, and other suitable or similar materials may be used in place of the epoxy.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A transceiver for a two-connector system including a front connector and a back connector connected to a substrate, the transceiver comprising:
a circuit board;
at least one cable attached to the circuit board; and
a housing arranged to contain the circuit board; wherein
when the transceiver is connected to the two-connector system, at least one front pad arranged along a front edge of the circuit board is arranged to engage with at least one corresponding contact of the front connector and at least one intermediate pad arranged along an intermediate portion of the circuit board is arranged to engage with at least one corresponding contact of the back connector; and
the transceiver is structured to simultaneously mate and unmate with the front connector and the back connector.

2. The transceiver of claim 1, wherein the housing includes a clip arranged to engage with at least one slot of the back connector.

3. The transceiver of claim 2, wherein the housing is arranged such that the clip is aligned to engage with the at least one slot of the back connector when the front edge of the circuit board is engaged with the front connector.

4. The transceiver of claim 1, wherein:
the circuit board includes at least one notch; and
the housing includes a clip arranged to pass through the at least one notch of the circuit board.

5. The transceiver of claim 1, wherein the at least one cable includes at least one of a coaxial cable, a shielded coaxial cable, a twinaxial cable, a twisted pair cable, a shielded twisted pair cable, and a shielded twinaxial cable.

6. The transceiver of claim 5, wherein a conductor of the coaxial cable is electrically connected to a pad of the circuit board and a conductive shield of the coaxial cable is electrically connected to a ground plane of the circuit board.

7. The transceiver of claim 1, wherein an epoxy covers the at least one cable and at least one pad of the circuit board.

8. The transceiver of claim 7, wherein a dielectric constant of the epoxy is within about ±20% of a dielectric constant of the circuit board.

9. The transceiver of claim 7, wherein the epoxy and the circuit board each have a dielectric constant between about 3.9 and about 4.2.

10. The transceiver of claim 1, wherein the at least one cable includes a first cable and a second cable.

11. The transceiver of claim 10, wherein electrical traces that are electrically connected to the first cable are arranged only on a top surface of the circuit board.

12. The transceiver of claim 10, wherein electrical traces that are electrically connected to the second cable are arranged on a bottom surface of the circuit board.

13. The transceiver of claim 10, wherein:
  a first epoxy covers the first cable and a first pad of the circuit board; and
  a second epoxy covers the second cable and a second pad of the circuit board.

14. The transceiver of claim 1, wherein the at least one cable is electrically connected to at least one pad near the front edge of the circuit board that is connected to the at least one front pad.

15. The transceiver of claim 1, wherein the housing includes undercuts arranged to receive at least one edge of the circuit board and alignment pins arranged to be inserted into holes in the circuit board.

16. The transceiver of claim 1, wherein the front connector is a 0.5-mm pitch edge-card connector; and
  the circuit board has a routing tolerance of +/−0.001" for engaging with the front connector.

17. A two-connector system comprising:
a substrate;
a front connector and a back connector connected to the substrate; and
a transceiver connected to the substrate through the front connector and the back connector, the transceiver including:
  a circuit board including at least one front pad arranged along a front edge of the circuit board and at least one intermediate pad arranged along an intermediate portion of the circuit board;
  at least one cable attached to the circuit board; and
  a housing arranged to receive the circuit board; wherein
  the transceiver simultaneously mates and unmates with the front connector and the back connector; and
  when the transceiver is mated with the front connector and the back connector, the at least one front pad engages with at least one corresponding contact of the front connector and the at least one intermediate pad engages with at least one corresponding contact of the back connector.

* * * * *